United States Patent
Li et al.

(10) Patent No.: US 12,320,579 B2
(45) Date of Patent: Jun. 3, 2025

(54) METHOD FOR UPDATING DATA OF REFRIGERATOR FRESHNESS RESERVATION MODEL, DEVICE AND STORAGE MEDIUM

(71) Applicants: CHONGQING HAIER REFRIGERATION ELECTRIC APPLIANCE CO., LTD., Chongqing (CN); QINGDAO HAIER REFRIGERATOR CO., LTD., Qingdao (CN); HAIER SMART HOME CO., LTD., Qingdao (CN)

(72) Inventors: Guixi Li, Qingdao (CN); Linglei Kong, Qingdao (CN); Jingrui Zhang, Qingdao (CN); Guangwu Wang, Qingdao (CN)

(73) Assignees: CHONGQING HAIER REFRIGERATION ELECTRIC APPLIANCE CO., LTD., Chongqing (CN); QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 0 days.

(21) Appl. No.: 17/768,840

(22) PCT Filed: May 27, 2020

(86) PCT No.: PCT/CN2020/092476
§ 371 (c)(1),
(2) Date: Apr. 13, 2022

(87) PCT Pub. No.: WO2021/109495
PCT Pub. Date: Jun. 10, 2021

(65) Prior Publication Data
US 2024/0133620 A1   Apr. 25, 2024
US 2024/0230214 A9   Jul. 11, 2024

(30) Foreign Application Priority Data

Dec. 2, 2019  (CN) .......................... 201911216065.9

(51) Int. Cl.
G06F 17/18   (2006.01)
F25D 29/00   (2006.01)
G06F 17/40   (2006.01)

(52) U.S. Cl.
CPC ............. *F25D 29/00* (2013.01); *G06F 17/18* (2013.01); *F25D 2500/06* (2013.01)

(58) Field of Classification Search
CPC ...... F25D 29/00; F25D 2500/06; G06F 17/18; G06F 16/23
(Continued)

(56) References Cited

U.S. PATENT DOCUMENTS

2018/0335252 A1* 11/2018 Oh .......................... F25D 29/00
2020/0088463 A1*  3/2020 Jeong ..................... G06F 3/167
2022/0282910 A1*  9/2022 Jeong .................... F25D 23/028

FOREIGN PATENT DOCUMENTS

CN    103793192 A    5/2014
CN    104197633 A    12/2014
(Continued)

*Primary Examiner* — Garcia Ade
(74) *Attorney, Agent, or Firm* — Cheng-Ju Chiang

(57) ABSTRACT

Disclosed are a method for updating data of a refrigerator freshness reservation model, a device and a storage medium. The method includes: S1, collecting refrigerator information of a plurality of users, wherein the refrigerator information of each user includes an item identifier corresponding to each of stored items in a refrigerator, and a usage frequency; S2, performing statistical computation on the refrigerator information to acquire a mean and a variance of usage frequencies corresponding to each food identifier; and S3, screening the refrigerator information based on the acquired mean and variance. In the present invention, uploaded data (Continued)

are automatically screened in an optimizing manner by mutual cooperation between the means and the variances, such that the uploaded data can be filtered, thereby maintaining the calculation accuracy while reducing the pressure on a server.

10 Claims, 5 Drawing Sheets

(58) Field of Classification Search
USPC .......................................................... 705/28
See application file for complete search history.

(56) References Cited

FOREIGN PATENT DOCUMENTS

| | | |
|---|---|---|
| CN | 105953520 A | 9/2016 |
| CN | 106996678 A | 8/2017 |
| CN | 107850384 A | 3/2018 |
| CN | 109446206 A | 3/2019 |
| WO | 2019/222740 A1 | 11/2019 |

* cited by examiner

| Food | Apple | Cherry | Cabbage | Banana | Mandarin orange | Litchi | Orange |
|---|---|---|---|---|---|---|---|
| User 1 | 2 | 1 | 2 | 1 | 3 | 0 | 4 |
| User 2 | 3 | 3 | 0 | 1 | 2 | 0 | 4 |
| User 3 | 2 | 2 | 5 | 2 | 4 | 0 | 0 |
| User 4 | 5 | 3 | 4 | 0 | 2 | 1 | 2 |
| User 5 | 0 | 3 | 4 | 0 | 1 | 0 | 2 |

| Food | Sum | $\mu$ | $\sigma^2$ |
|---|---|---|---|
| Apple | 12 | 2.4 | 2.637635 |
| Cherry | 12 | 2.4 | 0.64 |
| Cabbage | 15 | 3 | 3.199998 |
| Banana | 4 | 0.8 | 0.559999 |
| Mandarin orange | 12 | 2.4 | 1.04 |
| Litchi | 1 | 0.2 | 0.16 |
| Orange | 12 | 2.4 | 2.24 |

| Food | Apple | Cherry | Cabbage | Banana | Mandarin orange | Litchi | Orange |
|---|---|---|---|---|---|---|---|
| User 1 | 2 | 1 | 2 | 1 | 3 | 0 | |
| User 2 | 3 | 3 | | 1 | 2 | 0 | 4 |
| User 3 | 2 | 2 | | 2 | 4 | 0 | |
| User 4 | | 3 | 4 | 0 | 2 | 1 | 2 |
| User 5 | | 3 | 4 | 0 | 1 | 0 | 2 |

| Food | Sum | $\mu$ | $\sigma^2$ |
|---|---|---|---|
| Apple | 7 | 2.333 | 0.222222 |
| Cherry | 12 | 2.4 | 0.64 |
| Cabbage | 10 | 3.333 | 0.888889 |
| Banana | 4 | 0.8 | 0.559999 |
| Mandarin orange | 12 | 2.4 | 1.04 |
| Litchi | 1 | 0.2 | 0.16 |
| Orange | 8 | 2.667 | 0.888889 |

FIG. 6

```
S1
Collecting refrigerator information of a plurality of users, the
refrigerator information of each user including an item identifier
corresponding to each of stored items in a refrigerator, and a
usage frequency S2
Performing statistical computation on the refrigerator information to
acquire a mean and a variance of usage frequencies corresponding
to each food identifier S3
Screening the refrigerator information based on the acquired mean
and variance S4
Acquiring and keeping finally acquired calculation data of each
food set at the end of each preset time cycle, and selecting the
mean of the food set as public data of an item corresponding to a
current food set
```

FIG. 7

| Food | Apple | Cherry | Cabbage | Banana | Mandarin orange | Litchi | Orange |
|---|---|---|---|---|---|---|---|
| User 1 | 3 | 2 | 1 | 0 | 1 | 0 | 2 |
| User 2 | 2 | 3 | 0 | 0 | 3 | 0 | 2 |
| User 3 | 1 | 4 | 1 | 1 | 1 | 3 | 1 |
| User 4 | 1 | 0 | 1 | 0 | 0 | 1 | 3 |
| User 5 | 1 | 0 | 1 | 0 | 2 | 1 | 5 |

| Food | Sum | $\mu$ | $\sigma^2$ |
|---|---|---|---|
| Apple | 8 | 1.6 | 0.64 |
| Cherry | 9 | 3 | 0.666666 |
| Cabbage | 4 | 0.8 | 0.16 |
| Banana | 1 | 0.2 | 0.16 |
| Mandarin orange | 7 | 1.4 | 1.04 |
| Litchi | 5 | 1 | 1.199999 |
| Orange | 13 | 2.6 | 1.84 |

FIG. 10

| Food | Sum | $\mu$ | $\sigma^2$ |
|---|---|---|---|
| Apple | 7 | 2.333 | 0.222222 |
| Cherry | 21 | 2.657143 | 0.66017 |
| Cabbage | 14 | 2.609286 | 0.95187 |
| Banana | 5 | 0.68 | 0.52896 |
| Mandarin orange | 19 | 2.031579 | 1.06814 |
| Litchi | 1 | 0.2 | 0.16 |
| Orange | 21 | 2.625524 | 1.47778 |

FIG. 11

METHOD FOR UPDATING DATA OF REFRIGERATOR FRESHNESS RESERVATION MODEL, DEVICE AND STORAGE MEDIUM

CROSS-REFERENCE TO RELATED APPLICATION

The present application is a 35 U.S.C. § 371 National Phase conversion of International (PCT) Patent Application No. PCT/CN2020/092476, filed on May 27, 2020, which is based on and claims the priority of the Chinese patent application No. 201911216065.9 filed on Dec. 2, 2019 and with the title of "METHOD FOR UPDATING DATA OF REFRIGERATOR FRESHNESS RESERVATION MODEL, DEVICE AND STORAGE MEDIUM", which is incorporated herein in its entirety as reference. The PCT International Patent Application was filed and published in Chinese.

TECHNICAL FIELD

The present invention relates to the technical field of household appliances, and more particularly, to a method for updating data of a refrigerator freshness reservation model, a device and a storage medium.

BACKGROUND

With the development of science and technology, users have higher and higher requirements for the performances of refrigerators that have become necessary household appliances for many families.

The refrigerators tend to be smart in use over time. In particular, the realization of the smart refrigerators usually requires the support from big data. In the existing smart refrigerators, a server side collects refrigerator information through a network, and stores the collected refrigerator information in a database of the server side. The more information is stored, the more accurate statistical results are. However, with the increase of refrigerator users and the extension of the use period, there are more and more data in the database. Accordingly, in order to store the collected data, it is required to continuously expand a capacity of the database, causing a slower and slower data processing speed.

In order to avoid the above problems, the present invention provides a method for updating data of a refrigerator freshness reservation model. The method can reasonably screen uploaded data, and maintain the calculation accuracy while reducing; the pressure on a server.

SUMMARY

Objectives of the present invention are to provide a method for updating data of a refrigerator freshness reservation model, a device and a storage medium.

In order to achieve one of the above objectives of the present invention, an embodiment of the present invention provides a method for updating data of a refrigerator freshness reservation model. The method includes: S1, collecting refrigerator information of a plurality of users, wherein the refrigerator information of each user includes an item identifier corresponding to each of stored items in a refrigerator, and a usage frequency; and the usage frequency is a sum of times that each item is stored in the refrigerator within a unit time for each refrigerator, and/or a sum of times that each item is taken out from the refrigerator, and/or a difference between the sum of the times that the item is stored in the refrigerator and the sum of the times that the item is taken out from the refrigerator;

S2, performing statistical computation on the refrigerator information to acquire a mean and a variance of usage frequencies corresponding to each food identifier; and S3, screening the refrigerator information based on the acquired mean and variance.

As a further improvement of an embodiment of the present invention, the step S2 specifically includes:
respectively performing statistical computation on usage frequencies corresponding to each item identifier for each user within a cycle prior to the end time of each preset time cycle at the end of the preset time cycle;
allowing the usage frequencies with the same item identifier in all the users to form a food set; and
performing statistical computation on a mean and a variance of the usage frequencies in each food set.

As a further improvement of an embodiment of the present invention, the step S3 specifically includes:
determining whether the variance of each food set is not greater than a preset variance of an item identifier corresponding to a current food set at the end of each preset time cycle; and
if yes, keeping the acquired food set and using the food set as the screened refrigerator information; or
if not, deleting at least one maximum value and/or minimum value from the current food set to form a new food set, and recalculating a variance and a mean of the new food set until the variance of the usage frequencies in the current food set is less than the preset variance of the item identifier, and using the current new food set as the screened refrigerator information.

As a further improvement of an embodiment of the present invention, after the step S3, the method further includes:
S4, acquiring and keeping finally acquired calculation data of each food set at the end of each preset time cycle, the calculation data including a sum, a variance and a mean of usage frequencies of an item in the food set; and
selecting the mean of each food set as public data of an item corresponding to a current food set.

As a further improvement of an embodiment of the present invention, at the end of each preset time cycle, the step S4 further includes:
determining whether the public data of each food set is within a preset experience set; and if yes, updating the preset experience set based on the calculation data of the current food set;
or if not, keeping the current experience set for next verification, wherein the preset experience set is $(\mu-3\sigma^2, \mu+3\sigma^2)$ $\mu$, represents a preset mean, and $\sigma^2$ represents a preset variance.

As a further improvement of an embodiment of the present invention, the method includes:
assigning a constant value to $\mu$ and $\sigma^2$ in the preset experience set respectively before the refrigerator information of the plurality of users is collected; or
configuring the preset experience set to be empty before the refrigerator information of the plurality of users is collected, and assigning a mean and a variance corresponding to remaining refrigerator information after first screening of each item to $\mu$ and $\sigma^2$ in the corresponding preset experience set respectively after the refrigerator information of the plurality of users is collected.

As a further improvement of an embodiment of the present invention, in the step S4, if it is confirmed that the public data of the current food set is within the preset experience set, updating the preset experience set based on the calculation data of the current food set specifically includes:
assigning the mean and the variance in the calculation data of the current food set to $\mu$ and $\sigma^2$ respectively.

As a further improvement of an embodiment of the present invention, in the step S4, if it is confirmed that the public data of the current food set is within the preset experience set, updating the preset experience set based on the calculation data of the current food set specifically includes:
fusing calculation data kept in a current cycle with calculation data kept in a previous cycle to form new calculation data; and
assigning a mean and a variance in the new calculation data to $\mu$ and $\sigma^2$ in the preset experience set respectively,
wherein $sum_1 = sum_2 + sum^3$, $$\mu_1 = \frac{sum_2 * \mu_2 + sum_3 * \mu_3}{sum_2 + sum_3}, \text{ and}$$

$$\sigma_1^2 = \frac{1}{sum_2 + sum_3}\left[sum_2 * \sigma_2^2 + (\mu_1 - \mu_2)^2 + sum_3 * \sigma_3^2 + (\mu_1 - \mu_3)^2\right],$$

in which
$sum_1$ represents a sum of usage frequencies of an item in the new calculation data; $sum_2$ represents a sum of usage frequencies of an item in the calculation data in the previous cycle; $sum_3$ represents a sum of usage frequencies of an item in a current preset cycle; $\mu_1$ represents a mean in the new calculation data; $\mu_2$ represents a mean in the calculation data in the previous cycle; $\mu_3$ represents a mean in the calculation data in the current cycle; $\sigma_1^2$ represents a variance in the new calculation data; $\sigma_2^2$ represents a variance in the calculation data in the previous cycle; and $\sigma_3^2$ represents a variance in the calculation data in the current cycle.

In order to achieve another objective of the present invention, an embodiment of the present invention provides an electronic device, including a processor and a memory storing a computer program operable on the processor, wherein the computer program, when executed by the processor, causes the processor to perform the steps in the method for updating the data of the refrigerator freshness reservation model as described above.

In order to achieve yet another objective of the present invention, an embodiment of the present invention provides a computer-readable storage medium, wherein a computer program in the computer-readable storage medium, when executed by a processor, causes the processor to perform the steps in the method for updating the data of the refrigerator freshness reservation model as described above.

The present invention has the following beneficial effects. In the method for updating the data of the refrigerator freshness reservation model, the device and the storage medium according to the present invention, the uploaded data are automatically screened in an optimizing manner by mutual cooperation between the means and the variances, such that the uploaded data can be filtered, thereby maintaining the calculation accuracy while reducing the pressure on a server.

BRIEF DESCRIPTION OF THE DRAWINGS

FIG. 1 is a schematic flow chart of a method for updating data of a refrigerator freshness reservation model according to a first embodiment of the present invention;

FIG. 4 is a schematic flow chart of one of steps in FIG. 1 according to a preferred embodiment;

FIG. 7 is a schematic flow chart according to another preferred embodiment evolved from FIG. 1;

FIG. 8 is a schematic flow chart of one of steps in FIG. 7 according to a preferred embodiment; and FIGS. 2, 3, 5, 6, 9, 10, and 11 are data list diagrams of specific examples of the present invention.

DETAILED DESCRIPTION

The present invention will be described in detail below with reference to all embodiments shown in the accompanying drawings. However, these embodiments are not intended to limit the present invention, and changes of structures, methods or functions, made by a person of ordinary skill in the art in accordance with these embodiments, are included within the protective scope of the present invention.

Figures 1, 2:
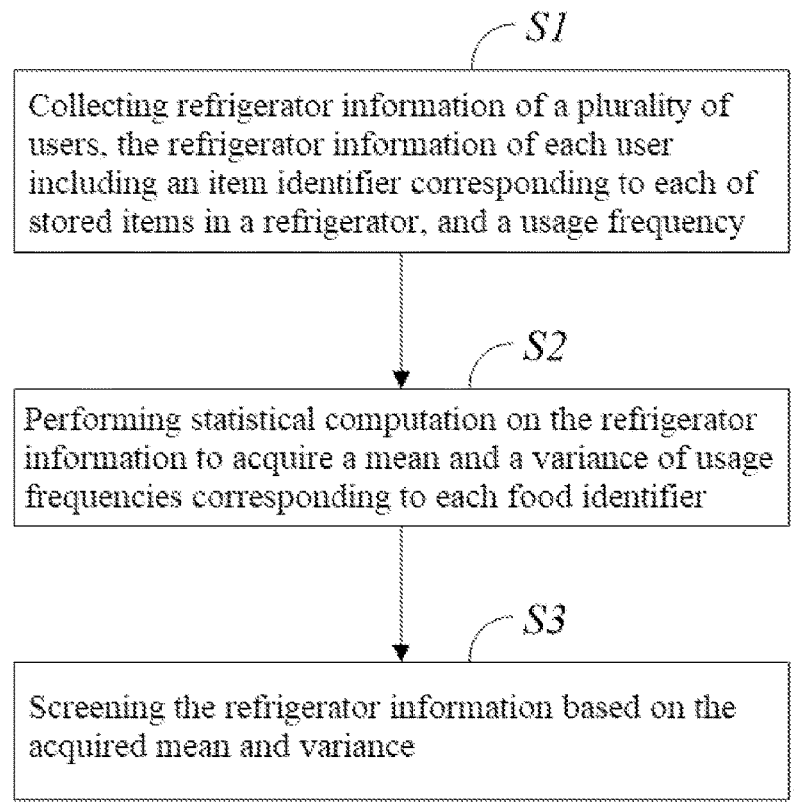

As shown in FIG. 1, a method for updating data of a refrigerator freshness reservation model is provided according to an embodiment of the present invention. The method includes the following steps.

In S1, refrigerator information of a plurality of users is collected, wherein the refrigerator information of each user includes an item identifier corresponding to each of stored items in a refrigerator, and a usage frequency; and the usage frequency is a sum of times that each item is stored in the refrigerator within a unit time for each refrigerator, and/or a sum of times that each item is taken out from the refrigerator, and/or a difference between the sum of the times that the item is stored in the refrigerator and the sum of the times that the item is taken out from the refrigerator.

In S2, statistical computation is performed on the refrigerator information to acquire a mean and a variance of usage frequencies corresponding to each food identifier.

In S3, the refrigerator information is screened based on the acquired mean and variance.

In implementable embodiments of the present invention, for step S1, during the use of the refrigerator, a user will frequently store/take out items in/from the refrigerator, wherein the items are usually real objects. Of course, other items such as cosmetics and medicines may also be stored according to different needs of the user. Based on the user's designation or system setting, each item usually has a unique item identifier corresponding to a specific item. Exemplarily, the item identifier is, for example, the name of the item. Of course, depending on different identification methods, the item identifier may also be a unique two-dimensional code, multi-dimensional code, RFD barcode, etc. on the item. Generally, the unit time defined in the present invention may be set according to specific requirements, such as one hour, one day and one week. For any item, the frequency may be selected as one or a combination of several of the number of times that the item is stored in the refrigerator, the number of times that the item is taken out from the refrigerator, and the difference between the number of times that the item is stored in the refrigerator and the number of times that the item is taken out from the refrigerator.

In the embodiments of the present invention, it is required to centrally process and screen the refrigerator information of the plurality of users. Thus, the refrigerator information of the plurality of users may be remotely collected by means of communication.

In a preferred embodiment of the present invention, for step S2, the method specifically includes: respectively performing statistical computation on usage frequencies corresponding to each item identifier for each user within a cycle prior to the end time of each preset time cycle at the end of the preset time cycle; allowing the usage frequencies with the same item identifier in all the users to form a food set; and performing statistical computation on a mean and a variance of the usage frequencies in each food set. Here, the preset time cycle is the above unit time.

The mean and the variance of each food set are $$\mu_{food} = \frac{\sum x_i}{\text{User}}$$

and $$\sigma^2_{food} = \frac{\sum (x_i - \mu_{food})^2}{\text{User}}$$

respectively, wherein $\mu_{food}$ represents the mean of a corresponding food set; $\sigma_{food}^2$ represents the variance of the corresponding food set; $x_i$ represents the usage frequency of any user in the food set; $\Sigma x_i$ represents a sum of the usage frequencies in the food set; and User represents the number of users in the food set.

With reference to FIG. 2, it is a list of food sets formed by refrigerator information collected in one cycle. In this specific example, in the food set formed based on the first statistical computation, a first column corresponds to respective users; a first row corresponds to item identifiers; each intersection in the table represents the use frequency of a specific item corresponding to a specific user; and each column of data corresponds to a data set.

Figures 3, 4, 5:
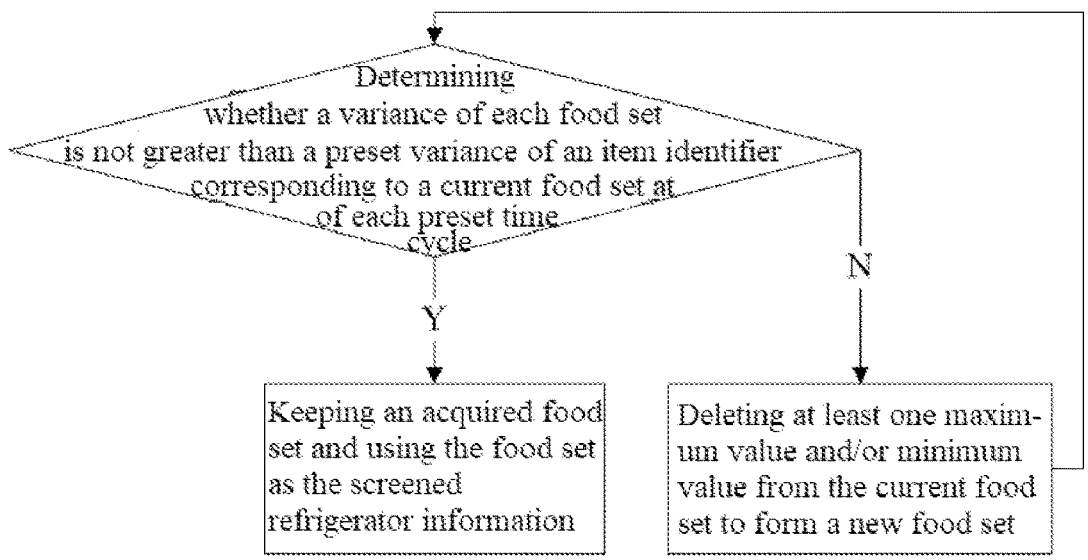

For the refrigerator information collected in one cycle, the calculation results are shown in FIG. 3. In this list, the data in the "sum" column represents the sum of the usage frequencies of each of the items corresponding to the food set; and $\mu$ and $\sigma^2$ respectively represent the mean and the variance of the item corresponding to the food set.

For example, the item identifier is "apple", wherein $$\mu_{f_{apple}} = \frac{(2+3+2+5+0)}{5} = 2.4 \text{ and}$$

$$\sigma^2_{apple^d} = \frac{(2-2.4)^2 + (3-2.4)^2 + (2-2.4)^2 + (5-2.4)^2 + (0-2.4)^2}{5} = 0.222222.$$

For step S3, with reference to FIG. 4, in an embodiment of the present invention, the method specifically includes: determining whether the variance of each food set is not greater than a preset variance of an item identifier corresponding to a current food set at the end of each preset time cycle; and if yes, keeping the acquired food set and using the food set as the screened refrigerator information; or if not, deleting at least one maximum value and/or minimum value from the current food set to form a new food set, and recalculating a variance and a mean of the new food set until the variance of the usage frequencies in the current food set is less than the preset variance of the item identifier, and using the current new food set as the screened refrigerator information.

Following the examples shown in FIGS. 2 and 3, in combination with FIG. 5, in this specific example, the selected preset variance being 2 is taken as an example for specific description. When the variance of a certain food set is greater than 2, one maximum value and one minimum value are deleted each time, and a diagonal line drawn in a cell represents data deletion.

Correspondingly, for "apple", "cabbage" and "orange", their variances after calculation are all greater than 2. Thus, it is required to delete the maximum and minimum values from the corresponding food sets; and new food sets as shown in FIG. 5 are formed after the parameters are deleted.

Further, the means and the variances of the new data set shown in FIG. 5 are recalculated, and the calculation results are shown in FIG. 6. After the second recalculation, the variances of all the food sets meet a keeping condition. Correspondingly, each food set in FIG. 5 corresponding to FIG. 6 is kept, and respective food sets shown in FIG. 5 are used as the screened refrigerator information.

In order to further reduce the pressure on a server, as shown in FIG. 7, in the preferred embodiment of the present invention, after step S3, the method further includes: S4, acquiring and keeping finally acquired calculation data of each food set at the end of each preset time cycle, wherein the calculation data includes a sum, a variance and a mean of usage frequencies of an item in the food set; and selecting the mean of each food set as public data of an item corresponding to a current food set.

The examples in FIGS. 2, 3, 5 and 6 show that in the process of processing each food set, calculation data corresponding to the finally kept food sets can be acquired respectively.

Figures 8, 9:
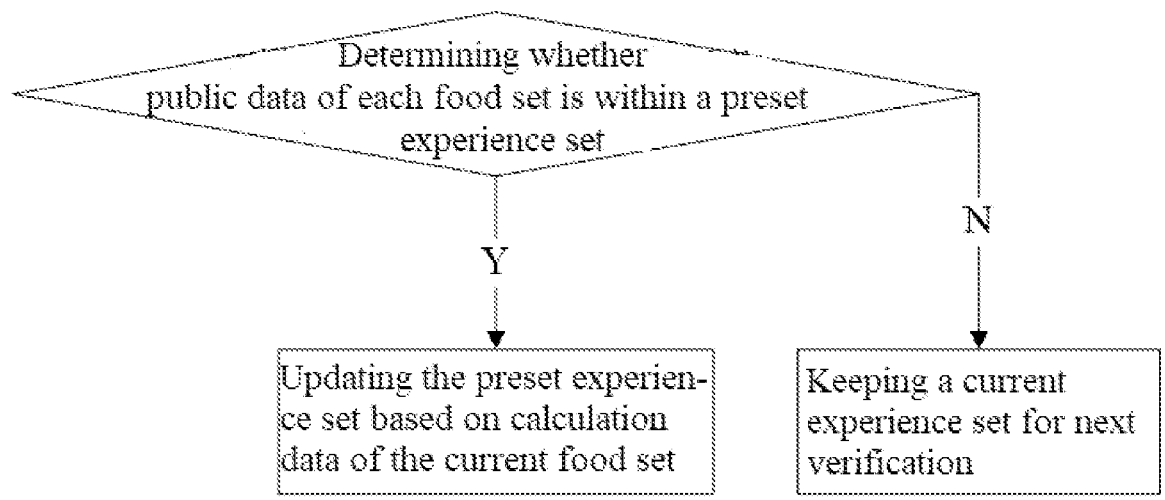

Further, with reference to FIG. 8, at the end of each preset time cycle, the step S4 further includes: determining whether the public data of each food set is within a preset experience set; and if yes, updating the preset experience set based on the calculation data of the current food set; or if not, keeping the current experience set for next verification, wherein the preset experience set is ($\mu-3\sigma^2$, $\mu+3\sigma^2$), $\mu$ representing a preset mean, and $\sigma^2$ representing a preset variance.

In an embodiment of the present invention, for the preset experience set, a constant value is assigned to $\mu$ and $\sigma^2$ in the preset experience set respectively before the refrigerator information of the plurality of users is collected; or the preset experience set is configured to be empty before the refrigerator information of the plurality of users is collected, and a mean and a vaRiance corresponding to remaining refrigerator information after first screening of each item are assigned to $\mu$ and $\sigma^2$ in the corresponding preset experience set respectively after the refrigerator information of the plurality of users is collected.

In a preferred embodiment of the present invention, if it is confirmed that the public data of the current food set is within the preset experience set, updating the preset experience set based on the calculation data of the current food set specifically includes: assigning the mean and the variance in the calculation data of the current food set to $\mu$ and $\sigma^2$ respectively. In this embodiment, the preset experience set is replaced with a value successfully verified upon the verification each time.

In another preferred embodiment of the present invention, in the step S4, if it is confirmed that the public data of the current food set is within the preset experience set, updating the preset experience set based on the calculation data of the current food set specifically includes: fusing calculation data kept in a current cycle with calculation data kept in a previous cycle to form new calculation data; and assigning a mean and a variance in the new calculation data to μ and $\sigma^2$ in the preset experience set respectively, wherein $sum_1 = sum_2 + sum_3$, $$\mu_1 = \frac{sum_2 * \mu_2 + sum_3 * \mu_3}{sum_2 + sum_3}, \text{ and}$$

$$\sigma_1^2 = \frac{1}{sum_2 + sum_3}\left[sum_2 * \sigma_2^2 + (\mu_1 - \mu_2)^2 + sum_3 * \sigma_3^2 + (\mu_1 - \mu_3)^2\right],$$

in which
$sum_1$ represents a sum of usage frequencies of an item in the new calculation data; $sum_2$ represents a sum of usage frequencies of the item in the calculation data in the previous cycle; $sum_3$ represents a sum of usage frequencies of the item in a current preset cycle; $\mu_1$ represents a mean in the new calculation data; $\mu_2$ represents a mean in the calculation data in the previous cycle; $\mu_3$ represents a mean in the calculation data in the current cycle; $\sigma_1^2$ represents a variance in the new calculation data; $\sigma_2^2$ represents a variance in the calculation data in the previous cycle; and $\sigma_3^2$ represents a variance in the calculation data in the current cycle.

It should be noted that, in this embodiment, after the first preset cycle, the mean and variance in the previous period call the data in the preset data set, and the usage frequency is 0.

In combination with FIG. 9 based on FIG. 6, FIG. 9 shows food sets collected in a current cycle, and FIG. 10 shows calculation data corresponding to the food sets in FIG. 9, FIG. 6 is the calculation data in the previous cycle, and the mean and the variance in FIG. 6 are assigned to μ and $\sigma^2$ in the corresponding preset experience set respectively.

Take "apple" and "cherry" as examples to illustrate the calculation.

With respect to "apple", 1.6>2.333−0.222222, as the public data of "apple" is not within the preset experience set, "apple" is not be updated.

With respect to "cherry", 2.4−0.64*3<3<2.4+0.64*3, as the public data of "cherry" is within in the preset experience set, "cherry" is updated through the equations: $sum_1 = sum_2 + sum_3$, $$\mu_1 = \frac{sum_2 * \mu_2 + sum_3 * \mu_3}{sum_2 + sum_3}, \text{ and}$$

$$\sigma_1^2 = \frac{1}{sum_2 + sum_3}\left[sum_2 * \sigma_2^2 + (\mu_1 - \mu_2)^2 + sum_3 * \sigma_3^2 + (\mu_1 - \mu_3)^2\right].$$

Accordingly, after calculation and fusion of the data in the two cycles in FIGS. 5 and 7 upon the calculation, data of "apple" and "litchi" are not updated, but data of "cherry", "cabbage", "banana" "mandarin orange" and "orange" are required to be updated. Updated results are shown in FIG. 11, and are not repeated herein.

An embodiment of the present invention provides an electronic device, including a processor and a memory storing a computer program operable on the processor, wherein the computer program, when executed by the processor, causes the processor to perform the steps in the method for updating the data of the refrigerator freshness reservation model as described above.

An embodiment of the present invention provides a computer-readable storage medium, wherein a computer program in the computer-readable storage medium, when executed by a processor, causes the processor to perform the steps in the method for updating the data of the refrigerator freshness reservation model as described above.

A person skilled in the art can clearly understand that for the sake of convenient and brief description, a particular working process of the above electronic device and the computer-readable storage medium can refer to a corresponding process in the foregoing method embodiments, and details are not repeated herein.

To sum up, in the method for updating the data of the refrigerator freshness reservation model, the device and the storage medium according to the present invention, the uploaded data are automatically screened in an optimizing manner by mutual cooperation between the means and the variances, such that the uploaded data can be filtered, thereby maintaining the calculation accuracy while reducing the pressure on a server.

It should be understood that although the description is described based on the embodiments, not every embodiment includes only one independent technical solution. This statement of the description is only for clarity. Those skilled in the art should treat the description as a whole, and technical solutions in all of the embodiments may also be properly combined to form other embodiments that will be understood by those skilled in the art.

The above detailed description only aims to specifically illustrate the available embodiments of the present invention, and is not intended to limit the protection scope of the present invention. Equivalent embodiments or modifications thereof made without departing from the spirit of the present invention shall fall within the protection scope of the present invention.

What is claimed is:

1. A method for updating data of a refrigerator freshness reservation model, comprising:
   S1, collecting, by a refrigerator, refrigerator information of a plurality of users, wherein the refrigerator information of each user comprises an item identifier corresponding to each of stored items in the refrigerator, and a usage frequency; and the usage frequency is a sum of times that each item is stored in the refrigerator within a unit time for the refrigerator, and/or a sum of times that each item is taken out from the refrigerator, and/or a difference between the sum of the times that the item is stored in the refrigerator and the sum of the times that the item is taken out from the refrigerator;
   S2, performing, by a processor of the refrigerator, statistical computation on the refrigerator information to acquire a mean and a variance of usage frequencies corresponding to each food identifier; wherein the mean is defined as $$\mu_{food} = \frac{\sum x_i}{\text{User}}$$

and the variance is defined as $$\sigma_{food}^2 = \frac{\sum (x_i - \mu_{food})^2}{\text{User}},$$

and wherein $\mu_{food}$ represents the mean of a corresponding food set; $\sigma_{food}^2$ represents the variance of the corresponding food set; $x_i$ represents a usage frequency of any user in the corresponding food set; $\Sigma x_i$ represents a sum of the usage frequencies in the corresponding food set; and User represents the number of users in the corresponding food set;

S3, screening, by the processor of the refrigerator, the refrigerator information based on the acquired mean and variance.

2. The method for updating the data of the refrigerator freshness reservation model according to claim 1, wherein the step S2 specifically comprises:

respectively performing statistical computation on usage frequencies corresponding to each item identifier for each user within a cycle prior to the end time of each preset time cycle at the end of the preset time cycle;

allowing the usage frequencies with the same item identifier in all the users to form the corresponding food set; and performing statistical computation on a mean and a variance of the usage frequencies of each food set.

3. The method for updating the data of the refrigerator freshness reservation model according to claim 2, wherein the step S3 specifically comprises:

determining whether a variance of each food set is not greater than a preset variance of an item identifier corresponding to a current food set at the end of each preset time cycle; and if yes, keeping an acquired food set and using the food set as the screened refrigerator information; or if not, deleting at least one maximum value and/or minimum value from the current food set to form a new food set, and recalculating a variance and a mean of the new food set until the variance of the usage frequencies in the current food set is less than the preset variance of the item identifier, and using the current new food set as the screened refrigerator information.

4. The method for updating the data of the refrigerator freshness reservation model according to claim 3, wherein after the step S3, the method further comprises:

S4, acquiring and keeping finally acquired calculation data of each food set at the end of each preset time cycle, the calculation data comprising a sum, a variance and a mean of usage frequencies of an item in the food set; and selecting a mean of the food set as public data of an item corresponding to a current food set.

5. The method for updating the data of the refrigerator freshness reservation model according to claim 4, wherein at the end of each preset time cycle, the step S4 further comprises:

determining whether the public data of each food set is within a preset experience set; and if yes, updating the preset experience set based on calculation data of the current food set; or if not, keeping a current experience set for next verification, wherein the preset experience set is $(\mu-3\sigma^2, \mu+3\sigma^2)$ $\mu$, u representing a preset mean, and $\sigma^2$ representing a preset variance.

6. The method for updating the data of the refrigerator freshness reservation model according to claim 5, comprising:

assigning a constant value to $\mu$ and $\sigma^2$ in the preset experience set respectively before the refrigerator information of the plurality of users is collected; or configuring the preset experience set to be empty before the refrigerator information of the plurality of users is collected, and assigning a mean and a variance corresponding to remaining refrigerator information after first screening of each item to $\mu$ and $\sigma^2$ in a corresponding preset experience set respectively after the refrigerator information of the plurality of users is collected.

7. The method for updating the data of the refrigerator freshness reservation model according to claim 5, wherein in the step S4, if it is confirmed that the public data of the current food set is within the preset experience set, updating the preset experience set based on the calculation data of the current food set specifically comprises:

assigning the mean and the variance in the calculation data of the current food set to $\mu$ and $\sigma^2$ respectively.

8. The method for updating the data of the refrigerator freshness reservation model according to claim 5, wherein in the step S4, if it is confirmed that the public data of the current food set is within the preset experience set, updating the preset experience set based on the calculation data of the current food set specifically comprises:

fusing calculation data kept in a current cycle with calculation data kept in a previous cycle to form new calculation data; and assigning a mean and a variance in the new calculation data to $\mu$ and $\sigma^2$ in the preset experience set respectively;

wherein $sum_1 = sum_2 + sum_3$;

$$\mu_1 = \frac{sum_2 * \mu_2 + sum_3 * \mu_3}{sum_2 + sum_3}; \text{ and}$$

$$\sigma_1^2 = \frac{1}{sum_2 + sum_3}[sum_2 * \sigma_2^2 + (\mu_1 - \mu_2)^2 + sum_3 * \sigma_3^2 + (\mu_1 - \mu_3)^2];$$

in which $sum_1$, represents a sum of usage frequencies of an item in the new calculation data; $sum_2$ represents a sum of usage frequencies of the item in the calculation data in the previous cycle; $sum_3$, represents a sum of usage frequencies of the item in a current preset cycle; $\mu_1$ represents a mean in the new calculation data; $\mu_2$ represents a mean in the calculation data in the previous cycle; $\mu_3$ represents a mean in the calculation data in the current cycle; $\sigma_1^2$ represents a variance in the new calculation data; $\sigma_2^2$ represents a variance in the calculation data in the previous cycle;

and $\sigma_3^2$ represents a variance in the calculation data in the current cycle.

9. An electronic device, comprising: a processor and a memory storing a computer program operable on the processor, wherein the computer program, when executed by the processor, causes the processor to perform the steps in the method for updating the data of the refrigerator freshness reservation model according to claim 1.

10. A computer-readable storage medium, wherein a computer program in the computer-readable storage medium, when executed by a processor, causes the processor to perform the steps in the method for updating the data of the refrigerator freshness reservation model according to claim 1.

* * * * *